(12) United States Patent
Ma (10) Patent No.: US 10,782,467 B2
(45) Date of Patent: Sep. 22, 2020

(54) LIGHT GUIDE DEVICE AND ITS MANUFACTURING METHOD, BACKLIGHT MODULE AND DISPLAY DEVICE

(71) Applicant: BOE TECHNOLOGY GROUP CO., LTD., Beijing (CN)

(72) Inventor: Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 97 days.

(21) Appl. No.: 15/760,966

(22) PCT Filed: Sep. 18, 2017

(86) PCT No.: PCT/CN2017/102053
§ 371 (c)(1),
(2) Date: Mar. 16, 2018

(87) PCT Pub. No.: WO2018/145462
PCT Pub. Date: Aug. 16, 2018

(65) Prior Publication Data
US 2019/0107663 A1   Apr. 11, 2019

(30) Foreign Application Priority Data
Feb. 10, 2017 (CN) .......................... 2017 1 0073170

(51) Int. Cl.
*F21V 7/04*     (2006.01)
*F21V 8/00*     (2006.01)
*G02F 1/13357*  (2006.01)

(52) U.S. Cl.
CPC ......... *G02B 6/0055* (2013.01); *G02B 6/0053* (2013.01); *G02F 1/133606* (2013.01); *G02B 6/0065* (2013.01); *G02F 2001/133607* (2013.01)

(58) Field of Classification Search
CPC ............... G02B 6/0015–0065; G92F 1/133605–133606; G92F 1/133615; G92F 2001/133607
(Continued)

(56) References Cited

U.S. PATENT DOCUMENTS

| 7,927,003 | B2* | 4/2011 | Chang .................. | G02B 6/0055 349/65 |
| 8,368,844 | B2* | 2/2013 | Ishikawa .............. | G02B 6/0016 349/65 |
| 2012/0147627 | A1 | 6/2012 | Pan | |

FOREIGN PATENT DOCUMENTS

| CN | 1289065 A | 3/2001 |
| CN | 1291729 A | 4/2001 |

(Continued)

OTHER PUBLICATIONS

International Search Report and Written Opinion for International App. No. PCT/CN2017/102053, dated Nov. 29, 2017.
(Continued)

*Primary Examiner* — Jason M Han
(74) *Attorney, Agent, or Firm* — Dinsmore & Shohl LLP (57) ABSTRACT

The present disclosure has disclosed a light guide device, comprising an optical waveguide layer (100), and a reflection layer (110) one surface of which is connected with the optical waveguide layer, said one surface including a plurality of protrusions (113), each protrusion including a first surface (114) forming a first angle ($\theta 1$) with respect to a surface of the optical waveguide layer, and a first intersection line (116) between a plane in which the surface of the optical waveguide layer is located and a plane in which the first surface is located being perpendicular to a light guiding direction of the optical waveguide layer. The present disclosure has disclosed a manufacturing method of a light
(Continued)

guide device as well as a backlight module and display device including the light guide device at the same time.

17 Claims, 3 Drawing Sheets

(58) Field of Classification Search
USPC .................................................. 362/623–626
See application file for complete search history.

(56) References Cited

FOREIGN PATENT DOCUMENTS

| | | |
|---|---|---|
| CN | 1629691 A | 6/2005 |
| CN | 102227587 A | 10/2011 |
| CN | 102798925 A | 11/2012 |
| CN | 103629600 A | 3/2014 |
| CN | 106547048 A | 3/2017 |
| JP | 2013-149559 A | 8/2013 |

OTHER PUBLICATIONS

First Office Action for CN Application No. 201710073170.6 dated Nov. 1, 2018.

* cited by examiner

LIGHT GUIDE DEVICE AND ITS MANUFACTURING METHOD, BACKLIGHT MODULE AND DISPLAY DEVICE

CROSS-REFERENCE TO RELATED APPLICATIONS

This application is a U.S. National Stage under 35 U.S.C. § 371 of PCT/CN2017/102053, filed on Sep. 18, 2017, which claims priority to and the benefit of Chinese Patent Application No. 201710073170.6, filed on Feb. 10, 2017, the entire contents of which are hereby incorporated by reference as part of this application.

TECHNICAL FIELD

The present disclosure relates to a light guide device and its manufacturing method, a backlight module and a display device

BACKGROUND

The manufacture and usage of the display device constituted by a light source, a light guide device and a light modulation device has become more and more widespread in recent years. As an important part of the display device, the performance of the light guide device greatly affects the performance of the display device, for example, the display effect and the like.

SUMMARY

The embodiments of the present disclosure provide a light guide device, comprising an optical waveguide layer, and a reflection layer one surface of which is connected with the optical waveguide layer, said one surface including a plurality of protrusions, each protrusion including a first surface forming a first angle with respect to a surface of the optical waveguide layer, and a first intersection line between a plane in which the surface of the optical waveguide layer is located and a plane in which the first surface is located being perpendicular to a light guiding direction of the optical waveguide layer.

The embodiments of the present disclosure further provide a backlight module, comprising a collimation incident light source and the aforementioned light guide device, wherein light of the collimation incident light source is incident on an incident end face of the optical waveguide layer at a predetermined angle.

The embodiments of the present disclosure further provide a display device, comprising a collimation incident light source, a light modulation device and the aforementioned light guide device, wherein light of the collimation incident light source is incident on an incident end face of the optical waveguide layer at a predetermined angle, and the light modulation device is arranged at the side of an opposite surface of a surface of the optical waveguide layer connected with the reflection layer.

The embodiments of the present disclosure provide a manufacturing method of a light guide device at the same time, which comprises forming a plurality of protrusions on one surface of a substrate, such that each protrusion includes a first surface defining a first angle with respect to the surface of the substrate so as to form a reflection layer; aligning the optical waveguide layer and the reflection layer in such a way that an intersection line between a plane in which the first surface is located and a plane in which the surface of the substrate is located is perpendicular to a light guiding direction of the optical waveguide layer, and connecting a surface of the reflection layer including the plurality of protrusions with the optical waveguide layer.

DETAILED DESCRIPTION

A plurality of embodiments of the present disclosure will be described in detail below with reference to the accompanying drawings.

Figure 1:
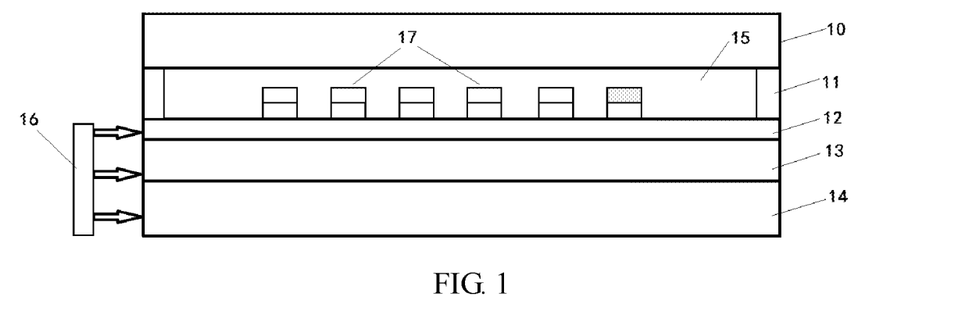
FIG. 1 is a schematic sectional view of a light guide device for obtaining a collimating surface light source in the related art.

The collimating surface light source is generally implemented by converting a point light source or a line light source into a surface light source. For example, FIG. 1 shows a schematic sectional view of a light guide device for obtaining a collimating surface light source in the related art. The light guide device comprises an upper substrate 10, a liquid crystal layer 15, a waveguide layer 12, a buffer layer 13 and a lower substrate 14 which are sequentially stacked. A sealant 11 is fixed on a lateral edge of the liquid crystal layer 15 which constitutes a transmissive grating. The collimation light from the collimation point/line light source 16 is incident on the waveguide layer 12, the buffer layer 13 and the lower substrate 14, and the light emergent from the waveguide layer 12 enters the liquid crystal layer 15. The diffraction of the grating is realized by a periodical property of the transmissive grating, and the period and duty ratio of the grating is controlled to obtain its light emergent direction.

However, as shown in FIG. 1, since the device employs a structure in which a metal electrode 17 and the grating are superimposed, the light output efficiency of the guided light is reduced. Moreover, the device needs to provide a liquid crystal box to control the grating, and the control manner thereof is quite complicated.

Figure 2:
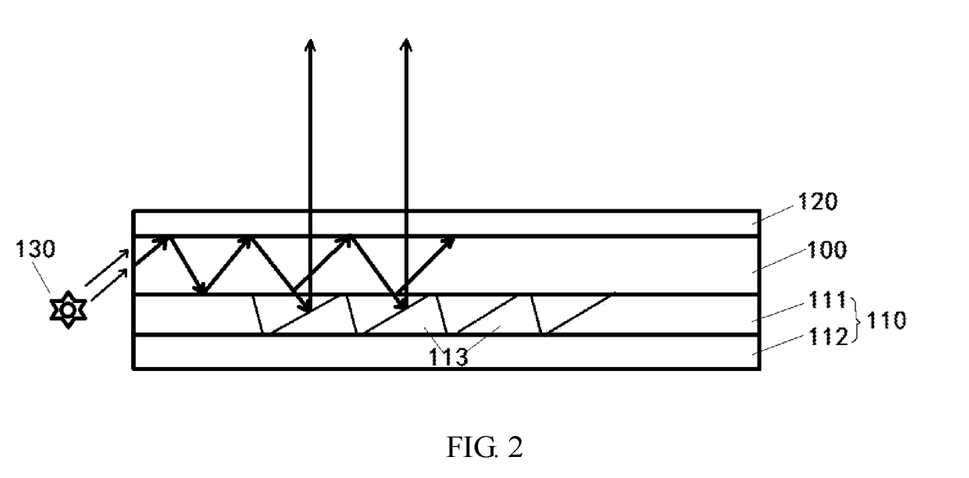
FIG. 2 is a schematic sectional view of the light guide device for obtaining a collimating surface light source according to the embodiments of the present disclosure.
Figure 3:
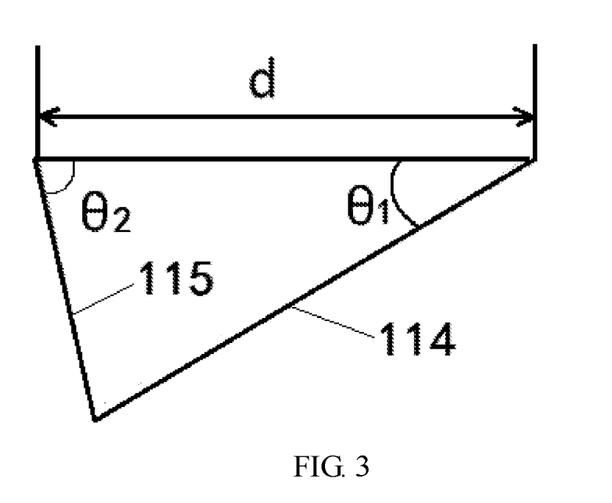
FIG. 3 is an enlarged view of a portion of the protrusion in FIG. 2.

FIG. 2 is a schematic sectional view of the light guide device for obtaining a collimating surface light source according to the embodiments of the present disclosure. FIG. 3 is an enlarged view of a portion of the protrusion in FIG. 2.

Figure 4:
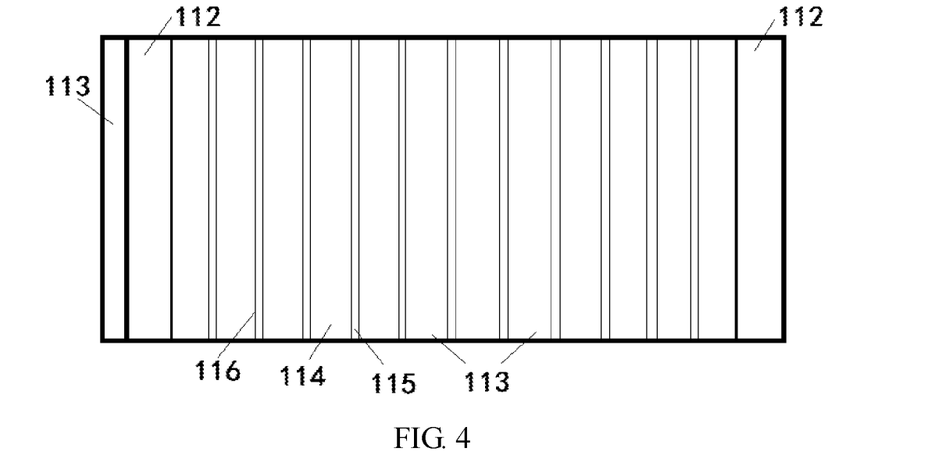
FIG. 4 is a schematic top view illustrating an arrangement structure of a plurality of protrusions in the light guide device according to the embodiments of the present disclosure.

As shown in FIGS. 2 and 3, the light guide device according to the embodiments of the present disclosure comprises an optical waveguide layer 100, and a reflection layer 110 one surface of which (an upper surface of the reflection layer as shown in the figures) is connected with the optical waveguide layer 100. The surface of the reflection layer includes a plurality of protrusions 113, each of which includes a first surface 114 that functions as a reflection surface in the present embodiment. As shown in FIG. 3, the first surface 114 forms a first angle θ1 with respect to the lower surface of the optical waveguide layer 100, and the spacing between the adjacent protrusions is d. The light guiding direction of the optical waveguide layer 100 is shown by a schematic arrow inside the optical waveguide 100 in FIG. 2. The first intersection line 116 (as shown in FIG. 4) between the plane in which the lower surface of the optical waveguide layer 100 is located and the plane in which the first surface 114 of each protrusion 113 is located is perpendicular to the light guiding direction of the optical waveguide layer 100, and the first intersection line is perpendicular to the paper plane of FIG. 2.

The light source 130 applied to the aforementioned light guide device as shown in FIG. 2 is a collimation line light source or constituted by a plurality of collimation point light sources. The light emitted by the light source 130 is incident into the optical waveguide layer 100 at a predetermined angle, and the light propagates in the form of total reflection within the optical waveguide layer 100. When the propagating light is reflected at a location of the lower surface present with a protrusion, with the presence of the first surface 114 of the lower protrusion serving as a reflection surface, a small portion of the light therein is guided in a coupled manner to the first surface 114 of the protrusion and reflected upwardly. By deriving a small portion of light at each protrusion, most of the light propagating within the optical waveguide layer 100 is guided out to the first surface 114 of the protrusion to perform the aforementioned reflection.

When the light is emergent upwards in FIG. 2 by reflection of the first surface 114 of the protrusion, due to the interference and diffraction effect of light, there exists a central maximal order in the reflection direction of the optical path, and the light intensity of other orders is far less than that of the central maximal order.

It is necessary to explain that, for convenient illustration in FIG. 2, the optical path emergent towards the reflection layer 110 from inside the optical waveguide layer 100 is shown as a straight line. In actual application, the optical path is not necessarily a straight line.

In the case of a definite reflection angle of the light within the optical waveguide layer 100, that is, in the case of a fixed incident angle of the light source 130, the first angle θ1 by the first surface 114 of the protrusion 113 inclined with respect to the lower surface of the optical waveguide layer 100, or the spacing d between adjacent protrusions is adjusted, or θ1 and d are adjusted simultaneously when the light guide device is manufactured, so that only the central maximum order of the diffraction of the grating is emergent upwards in a particular angle (for example directly upward in FIG. 2, it may also be in other angles), while other orders are not emergent upwards. During a specific manufacture, the value of d may be within the range of 0.2 μm to 5 μm, and the value of θ1 may be within the range of 10° to 70°.

In the case of an adjustable incident angle of the light source 130, fixed values may be taken for θ1 and d together when the light guide device is manufactured, and the incident angle of the light source 130 towards the optical waveguide layer 100 is adjusted in a manual or mechanical manner when a backlight module is assembled, such that the incident angle of the light source 130 is fixed when the light emergent by the light emitting surface of the optical waveguide layer 100 defining a particular angle with respect to the light emitting surface (for example perpendicular to the light emitting surface, or other angles) reaches a maximum intensity. The determination of the light of the particular angle reaching a maximum intensity may be manually done or measured by an optical system. For example, whilst adjusting an incident angle of the light source 130, the calibrator faces directly with the emergent surface of the optical waveguide layer 100, and by repeatedly adjusting the incident angle of the light source within certain angle range, the calibrator determines which incident angle the light source 130 is situated to witness the emergent light with a maximum intensity. As this is usually the case of using a light guide as a display backlight, the emergent light of the light guide device is generally in an intensity bearable by human eye, and thus the emergent light is in a maximum intensity may be judged by human eye. Under such circumstance, it is not necessary to accurately design the values of θ1 and d of each protrusion in the light guide device, but only necessary to uniformly take the values of θ1 and d, and adjust a direction of the light source 130, so as to be able to realize a substantially collimated surface light source. In the meantime, when the light guide device is used as a display backlight having a peep-proof function, there is no requirement for a very high precision of the emergent angle of the emergent light, i.e. it is not required to be absolutely perpendicular to the emergent surface, so that it may be easily realized by manual adjustment. In addition, when there is a requirement for a very high precision of the angle of the emergent light, the angle of the emergent light may be measured by an optical system or an optical sensing device, and the incident angle of the light source 130 is precisely adjusted in cooperation with mechanical manner.

As the aforementioned light guide device according to the embodiments of the present disclosure has a high light output efficiency, it is only necessary to adjust a direction of the collimation line/point light source incident on the optical waveguide layer, such as to be able to obtaining the collimating surface light source. Compared to the light guide device of a related collimating surface light source, it is controlled in a simple manner, and easy to implement.

In some embodiments of the present disclosure, the plurality of protrusions 113 of the reflection layer 110 may be continuously arranged on the surface of the reflection layer 110 (the upper surface of the reflection layer 110 in FIG. 2). The manner in which the plurality of protrusions 113 are arranged continuously may be, for example, continuous arrangement in a partial area of the surface of the reflection layer 110, or may also be continuous arrangement over an entire area of the surface of the reflection layer 110. By means of the light guide device according to the embodiment of the present disclosure, it is possible to provide a collimating surface light source that functions as a backlight.

FIG. 4 is a schematic top view illustrating one arrangement structure of a plurality of protrusions in the light guide device according to the embodiments of the present disclosure. As shown in FIG. 4, the first surface 114 of each protrusion 113 extends along a direction of the first intersection line 116 from one end of the reflection layer 110 to the other end. By means of the light guide device of the present embodiment, a very high light output efficiency can be achieved. It should be noted that, the width of the first surface 114 of the protrusion 113 shown in FIG. 4 is magnified many times for convenient illustrative explanation, and the surface width of the protrusion in the actually manufactured light guide device cannot be discerned by naked eye.

In some further embodiments of the present disclosure, the plurality of protrusions 113 in the reflection layer 110 may be arranged in a predetermined pattern on the surface of the reflection layer 110. The predetermined pattern may be, for example, a trademark, a warning pattern/typeface, a pattern of particular characters such as a company name, for the purposes such as marking and demonstration. By means of the light guide device of the present embodiment, a collimating surface light source with a particular light output pattern can be implemented.

In some embodiments of the present disclosure, adjacent protrusions 13 may be filled with a light-transmission material therebetween, and the optical waveguide layer 100 should have a refractive index which is greater than that of the light-transmission material, so as to facilitate total reflection performed within the optical waveguide layer 100. The present embodiment may form a flat surface of the reflection layer 110 to be connected with the optical waveguide layer 100 without affecting a reflection optical path, so as to facilitate stacking and fixing performed between the reflection layer 110 and the optical waveguide layer 100. The present disclosure is not limited to the case of filling the light-transmissive material between the adjacent protrusions. For example, the reflection layer 110 and the optical waveguide layer 100 may be pressed and fixed to each other by applying a biasing force.

As an embodiment, the upper surface of the optical waveguide layer 100 in FIG. 2 may be provided with a cover layer 120 for better performing total reflection by the optical waveguide layer 100, so as to improve the light utilization ratio and further improve the light output efficiency. The refractive index of the optical waveguide layer 100 should be greater than that of the cover layer 120.

In the embodiments of the present disclosure, the first surface 114 of each of the protrusions 113 may be coated with a reflection material, for example, a layer of metallic silver may be coated to improve the reflection intensity, thereby greatly improving the light output efficiency. The coated reflection material is not limited to metallic silver, but may also be a material with a strong reflective capability, such as aluminum or magnesium.

In one embodiment of the present disclosure, as shown in FIGS. 2-3, each protrusion 113 may further include a second surface 115 that is also used for reflection, in addition to the first surface 114 for reflection. The second surface 115 defines a second angle θ2 with respect to the lower surface of the optical waveguide layer 100, and the second intersection line between the plane in which the lower surface of the optical waveguide layer 100 is located and the plane in which the second surface 115 is located is also perpendicular to a light guiding direction of the optical waveguide layer 100.

In the above-described embodiment of the present disclosure, the first angle θ1 and the second angle θ2 may be the same or different. When the first angle θ1 and the second angle θ2 are different, for example, as shown in FIGS. 2-3, the same light guide device may correspond to two different incident angles of the light source 130, thus improving the applicable range of the light guide device. When the first angle θ1 and the second angle θ2 are the same, for example, both 45 degrees, the light source may be disposed at an incident end at one-side of the optical waveguide layer of the light guide device or at an incident end at the other-side of the optical waveguide layer of the light guide device, without specifically marking which incident end needs to be provide with a light source, thus improving the convenience when the backlight module is assembled using the light guide device of the present disclosure.

In the aforementioned embodiment of the present disclosure, for each protrusion, the first intersection line 116 may be parallel to, coincide with or be perpendicular to the second intersection line, respectively suitable for different occasions according to different requirements.

FIGS. 2 and 4 show an example in which the first intersection line 116 coincides with the second intersection line, i.e. each protrusion has a triangular cross section. When the first intersection line 116 is parallel to the second intersection line, each protrusion has a trapezoidal cross section. The embodiment in which the first intersection line 116 coincides with the second intersection line may achieve a very high light output efficiency.

When the first intersection line 116 is perpendicular to the second intersection line, the position relation between the first surface 114 and the second surface is similar to the relation between two adjacent sides of a pyramid. Each protrusion 113 may also have more surfaces in addition to such two surfaces, for example, it may have four sides similar to a pyramid. The embodiment in which the first intersection line 116 is perpendicular to the second intersection line applies to the case in which the reflectance of the light is not demanding or there is a special requirement for a very low reflectance.

In the embodiments of the present disclosure, similar to the first surface 114, the second surface 115 of each of the protrusions may also be covered with a reflection material, for example, a layer of metallic silver may be coated to improve the reflection intensity, thereby greatly improving the light output efficiency. The coated reflection material is not limited to metallic silver, but may also be a material with a strong reflective capability, such as aluminum or magnesium.

As shown in FIG. 2, in some embodiments of the present disclosure, the reflection layer 110 may include a substrate 112 and a protrusion forming layer 111. The latter includes a plurality of protrusions 113 and is formed on an upper surface of the substrate 112. The material of the substrate 112 may be different from that of the plurality of protrusions 113. That is, a plurality of protrusions 113 are formed on the already prepared substrate 112 using another material to fabricate the protrusion forming layer 111. In this way, it is convenient to form a plurality of protrusions 113 arranged in a predetermined pattern. Or the substrate 112 may be formed integrally with the plurality of protrusions 113. That is, a plurality of protrusions 113 are formed by performing a processing such as notching on the upper surface of the substrate 112. In this way, it is convenient to form a plurality of protrusions 113 that are continuously arranged.

In various embodiments of the present disclosure, the material of the substrate 112 and the material of the plurality of protrusions 113 may be respectively selected from metallic material, non-metallic material, or metalloid material. For example, the substrate 112 may be an aluminum substrate, a glass substrate or a silicon substrate, the protrusion 113 may be a protrusion made from resin and formed on a glass substrate or a protrusion made of metal, or may also be a protrusion formed by notching on an aluminum substrate or a silicon substrate, etc.

The backlight module according to the embodiments of the present disclosure may be formed, by fixedly coupling the light guide device with the light source 130 as shown in FIG. 2. Specifically, the collimation incident light source 130 is fixedly disposed at the incident end of the optical waveguide layer 100 of the light guide device in any one of the aforementioned embodiments, and the light of the collimation incident light source 130 is adjusted in a manual or mechanical manner to be incident on the incident end face of the optical waveguide layer 100 at a predetermined angle. The incident angle of the light source 130 is fixed when the light emergent by the light emitting surface of the optical waveguide layer 100 defining a particular angle with respect to the light emitting surface (for example perpendicular to the light emitting surface, or forming other angles) reaches a maximum intensity, so as to fabricate the backlight module according to the embodiments of the present disclosure, to obtain a collimating surface light source with a high light output efficiency and a simple control manner.

Figure 5:
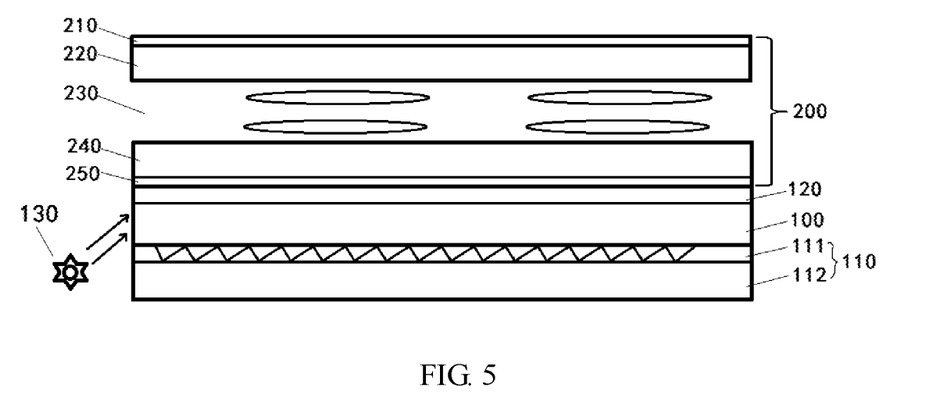
FIG. 5 is a schematic sectional view of the display device according to the embodiments of the present disclosure.

FIG. 5 is a schematic sectional view of the display device according to the embodiments of the present disclosure.

As shown in FIG. 5, the display device according to the embodiments of the present disclosure may be formed by assembling the light modulation device with the above-described collimation incident light source 130 and the light guide device of each embodiment. In the display device, the light of the collimation incident light source 130 is incident on the incident end face of the optical waveguide layer 100 at a predetermined angle, and the optical modulation device is coupled to the upper face of the optical waveguide layer 100.

The light modulation device in the present embodiment is a liquid crystal panel 200. The liquid crystal panel 200 includes an upper polarizer 210, a color film substrate 220, a liquid crystal layer 230, an array substrate 240 and a lower polarizer 250 stacked in order. The light emergent from the upper surface of the optical waveguide layer 100 enters the lower polarizer 250 as a collimation backlight of the liquid crystal panel 200 and undergoes a series of optical modulations by the liquid crystal panel 200.

The display device according to the embodiments of the present disclosure utilizes the light guide device according to the embodiments of the present disclosure to obtain a collimating surface light source, so that a peek-proof display may be achieved. That is, the light emitted by the display device is substantially parallel to the same direction, which is generally toward a user of the display device, so that other people at a location offset from this direction basically cannot see the content displayed on the display device. In this way, for example, when a user views personal information displayed on a mobile phone or commercial materials displayed on a laptop, there is no need to worry that others intentionally or unintentionally acquires these contents.

In the display device of the embodiments of the present disclosure, the light modulation device may also be a liquid crystal prism or the like, for further modulation of the direction of collimation light emergent from the light guide device. This applies to the case in which there is requirement to control the direction of the light. Under such circumstance, there is a need to firstly have a surface light source with a collimated direction, in order to proceed to the light modulation in the next step. For example, when there is a need to control whether the collimation emergent light enters human eye or not, the modulation of a direction of the collimation light may be realized by utilizing a power-on state and a power-off state of the liquid crystal prism.

The light modulation device in the embodiments of the present disclosure is not limited to the liquid crystal panel and the liquid crystal prism described above, but may also be a device for modulating a light propagation direction, such as a liquid crystal lens.

Figure 6:
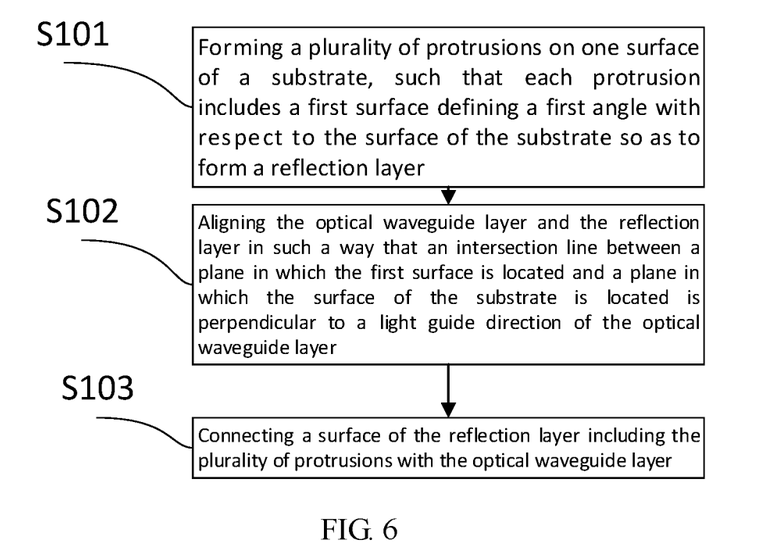
FIG. 6 is a schematic flow chart of the manufacturing method of a light guide device according to the embodiments of the present disclosure.

FIG. 6 is a schematic flow chart of the manufacturing method of a light guide device according to the embodiments of the present disclosure.

As shown in FIG. 6, the manufacturing method of a light guide device according to an embodiment of the present disclosure comprises:

S101. forming a plurality of protrusions on one surface of a substrate, such that each protrusion includes a first surface defining a first angle with respect to the surface of the substrate so as to form a reflection layer;

S102. aligning the optical waveguide layer and the reflection layer in such a way that an intersection line between a plane in which the first surface is located and a plane in which the surface of the substrate is located is perpendicular to a light guide direction of the optical waveguide layer;

S103. connecting a surface of the reflection layer including the plurality of protrusions with the optical waveguide layer.

Referring to the structure of the light guide device in FIGS. 2-4, in the manufacturing method according to the embodiments of the present disclosure, for example, the glass substrate 112 may be prepared in the first place, and then periodical and ramp-shaped protrusions 113 are made from a material such as resin on the glass substrate 112, so that each protrusion 113 includes a first surface 114 inclined at a first angle $\theta 1$ with respect to the surface of the substrate 112.

The protrusions 113 may be arranged in a predetermined pattern to obtain a collimating surface light source having a predetermined light output pattern, or arranged substantially throughout the entire surface of the substrate 112 as shown in FIG. 4 to serve as a large-area collimation backlight source.

In this manner, the reflection layer 110 including the substrate 112 and the protrusion forming layer 111 is formed by the step S101.

The manner of forming the protrusions 113 is not limited to forming the protrusions 113 with resin on the glass substrate, and the protrusions 113 may also be formed in a manner of notching on the silicon substrate or the metal substrate. Alternatively, instead of using resin, a layer of metal film is firstly formed on a glass substrate before a protrusion 113 is formed in a manner of chamfering the metal film. It is also possible to firstly form a resin layer or a metal film on the glass substrate before forming a plurality of protrusions thereon by utilizing a mask with a graded transmittance. The manner of directly notching the substrate to form the protrusions facilitates the formation of a plurality of protrusions 113 that are continuously arranged, while the manner of forming a plurality of protrusions on the prepared substrate by using another material facilitates the formation of a plurality of protrusions 113 arranged in a predetermined pattern.

As one embodiment, in the step 101, each protrusion 113 formed on the upper surface of the substrate 112 may further include a second surface 115 defining a second angle with respect to the surface of the substrate 112, and an intersection line between a plane in which the second surface is located and a plane in which the surface of the substrate is located parallel to, coincide with or perpendicular to an intersection line between a plane in which the first surface is located and a plane in which the surface of the substrate is located. For the detailed descriptions, please refer to the previous descriptions.

After the step 101, it is also possible to add the step of covering a reflection material on the first surface 114 of each protrusion 113 and/or the step of filling a light-transmissive material between adjacent protrusions 113.

For example, a layer of metallic silver (or other metals with a favorable reflective property) may be formed on the first surface 114 of each protrusion with a mask using conventional exposure, developing and etching processes, and then the recesses between adjacent protrusions is filled up by utilizing an OC (Over Coating) material (for example epoxy), and a layer of optical waveguide layer 100 is further formed on the OC material. The optical waveguide layer may use a material such as $Si_3N_4$ and $SiO_2$. A further cover layer may also be selectively formed on the optical waveguide layer 100, so as to strength the total reflection performance of the optical waveguide layer 100. The refractive index of the optical waveguide layer 100 is greater than that of the cover layer and the OC layer as well as the resin used for manufacturing the protrusions.

Subsequently, in the step S102, the orientation of the optical waveguide layer 100 to be stacked is adjusted so that the first surface 114 or the second surface 115 of each protrusion 113 on the reflection layer 110 faces towards the incident end face of the optical waveguide layer, to allow that an intersection line between a plane in which the first surface is located and a plane in which the surface of the substrate is located is perpendicular to a light guiding direction of the optical waveguide layer.

Finally, in the step S103, the lower surface of the optical waveguide layer 100 and the upper surface of the reflection layer 110 are connected, stacked and fixed, so as to form the light guide device according to the embodiments of the present disclosure.

As the light guide device made by the manufacturing method according to the embodiments of the present disclosure has a high light output efficiency, it is only necessary to adjust a direction of the collimation line/point light source incident on the optical waveguide layer, such as to be able to obtain the collimating surface light source. Compared to the light guide device of a related collimating surface light source, it is controlled in a simple manner, and easy to implement.

A plurality of embodiments of the present disclosure have been described above, but the present disclosure is not limited to these embodiments. Those skilled in the art can make various amendments or modifications to such embodiments on the premise of not departing from the concept of the present invention, and such amendments or modifications all fall within the scope sought to be protected in the present invention.

What is claimed is:

1. A light guide device, comprising an optical waveguide layer, and a reflection layer, one surface of which is connected with the optical waveguide layer, said one surface including a plurality of protrusions, each protrusion including a first surface and a second surface, the first surface and the second surface of the same protrusion are disposed in such order in a light guiding direction of the optical waveguide layer, the first surface forms a first angle with respect to a surface of the optical waveguide layer, a first intersection line between a plane in which the surface of the optical waveguide layer is located and a plane in which the first surface is located being perpendicular to the light guiding direction of the optical waveguide layer, and light in the light guide device is directed out of the light guide device by reflection on a part of the first surface which is not in contact with the optical waveguide layer, wherein among the first surface and the second surface, only the first surface of each protrusion is covered with a reflection material.

2. The light guide device according to claim 1, wherein, the plurality of protrusions is continuously arranged over an entire area of said one surface;
the plurality of protrusions is continuously arranged over a partial area of said one surface; or
the plurality of protrusions is arranged in a predetermined pattern.

3. The light guide device according to claim 1, wherein, a light-transmission material is filled in a gap between adjacent protrusions, and the optical waveguide layer has a refractive index which is greater than that of the light-transmission material.

4. The light guide device according to claim 1, wherein, an opposite surface of a surface of the optical waveguide layer connected with the reflection layer is provided with a cover layer, and the optical waveguide layer has a reflective index which is greater than that of the cover layer.

5. The light guide device according to claim 1, wherein, the first surface of each protrusion extends from one end of the reflection layer to another end along a direction of the first intersection line.

6. The light guide device according to claim 1, wherein, the second surface of the protrusion defines a second angle with respect to the surface of the optical waveguide layer, wherein for each protrusion, the first intersection line is parallel to, coincides with or is perpendicular to a second intersection line between a plane in which the surface of the optical waveguide layer is located and a plane in which the second surface is located.

7. The light guide device according to claim 1, wherein, the reflection layer includes a substrate, the plurality of protrusions is formed on a surface of a substrate, a material of the substrate is different from that of the plurality of protrusions, and at least one of the material of the substrate or that of the plurality of protrusions is selected from a metallic material, a non-metallic material, or a metalloid material.

8. A backlight module, comprising a collimation incident light source and a light guide device comprising an optical waveguide layer, and a reflection layer, one surface of which is connected with the optical waveguide layer, said one surface including a plurality of protrusions, each protrusion including a first surface and a second surface, the first surface and the second surface of the same protrusion are disposed in such order in a light guiding direction of the optical waveguide layer, the first surface forms a first angle with respect to a surface of the optical waveguide layer, a first intersection line between a plane in which the surface of the optical waveguide layer is located and a plane in which the first surface is located being perpendicular to the light guiding direction of the optical waveguide layer, and light in the light guide device is directed out of the light guide device by reflection on a part of the first surface which is not in contact with the optical waveguide layer, wherein light of the collimation incident light source is incident on an incident end face of the optical waveguide layer at a predetermined angle, and
wherein among the first surface and the second surface, only the first surface of each protrusion is covered with a reflection material.

9. A display device, comprising a collimation incident light source, a light modulation device and a light guide device comprising an optical waveguide layer, and a reflection layer, one surface of which is connected with the optical waveguide layer, said one surface including a plurality of protrusions, each protrusion including a first surface and a second surface, the first surface and the second surface of the same protrusion are disposed in such order in a light guiding direction of the optical waveguide layer, the first surface forms a first angle with respect to a surface of the optical waveguide layer, a first intersection line between a plane in which the surface of the optical waveguide layer is located and a plane in which the first surface is located being perpendicular to the light guiding direction of the optical waveguide layer, and light in the light guide device is directed out of the light guide device by reflection on a part of the first surface which is not in contact with the optical waveguide layer, wherein light of the collimation incident light source is incident on an incident end face of the optical waveguide layer at a predetermined angle, and the light modulation device is arranged at the side of an opposite surface of a surface of the optical waveguide layer connected with the reflection layer, and wherein among the first surface and the second surface, only the first surface of each protrusion is covered with a reflection material.

10. A manufacturing method of a light guide device comprising:

forming a plurality of protrusions on one surface of a substrate, such that each protrusion includes a first surface and a second surface, the first surface forms a first angle with respect to the surface of the substrate so as to form a reflection layer;

among the first surface and the second surface, covering only the first surface of each protrusion with a reflection material;

aligning an optical waveguide layer and the reflection layer in such a way that an intersection line between a plane in which the first surface is located and a plane in which the surface of the substrate is located is perpendicular to a light guiding direction of the optical waveguide layer and the first surface and the second surface of the same protrusion are disposed in such order in the light guiding direction of the optical waveguide layer, and connecting a surface of the reflection layer including the plurality of protrusions with the optical waveguide layer, and light in the light guide device is directed out of the light guide device by reflection on a part of the first surface which is not in contact with the optical waveguide layer.

11. The manufacturing method according to claim 10, wherein, forming a plurality of protrusions on one surface of a substrate includes:

forming a plurality of protrusions arranged continuously over an entire area of said one surface of the substrate;

forming a plurality of protrusions arranged continuously over a partial area of said one surface of the substrate; or forming a plurality of protrusions arranged in a predetermined pattern over said one surface of the substrate.

12. The manufacturing method according to claim 10, wherein, after forming a plurality of protrusions on one surface of a substrate, the manufacturing method further includes at least one of:

filling a light-transmission material between adjacent protrusions.

13. The manufacturing method according to claim 10, wherein, the second surface defines a second angle with respect to the surface of the substrate, and an intersection line between a plane in which the second surface is located and a plane in which the surface of the substrate is located parallel to, coincide with or perpendicular to an intersection line between a plane in which the first surface is located and a plane in which the surface of the substrate is located.

14. The manufacturing method according to claim 10, wherein, the plurality of protrusions is formed by a process of notching on said one surface of the substrate; or the plurality of protrusions is formed by a process of notching a metal film after forming a metal film on said one surface of the substrate; or the plurality of protrusions is formed on said one surface of the substrate using a mask with a gradually changed transmittance.

15. The manufacturing method according to any one of claim 11, wherein, the plurality of protrusions is formed by a process of notching on said one surface of the substrate; or the plurality of protrusions is formed by a process of notching a metal film after forming a metal film on said one surface of the substrate; or the plurality of protrusions is formed on said one surface of the substrate using a mask with a gradually changed transmittance.

16. The manufacturing method according to any one of claim 12, wherein, the plurality of protrusions is formed by a process of notching on said one surface of the substrate; or the plurality of protrusions is formed by a process of notching a metal film after forming a metal film on said one surface of the substrate; or the plurality of protrusions is formed on said one surface of the substrate using a mask with a gradually changed transmittance.

17. The manufacturing method according to any one of claim 13, wherein, the plurality of protrusions is formed by a process of notching on said one surface of the substrate; or the plurality of protrusions is formed by a process of notching a metal film after forming a metal film on said one surface of the substrate; or the plurality of protrusions is formed on said one surface of the substrate using a mask with a gradually changed transmittance.

* * * * *